June 4, 1935.  M. FRIEDRICH  2,003,631
SAND BRAKING DEVICE, PARTICULARLY ADAPTED FOR USE ON AUTOMOBILES
Filed March 30, 1933
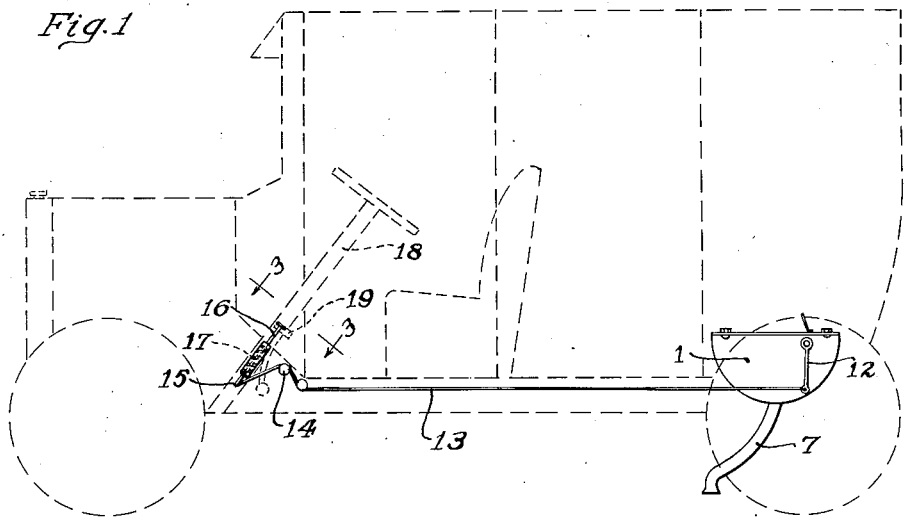
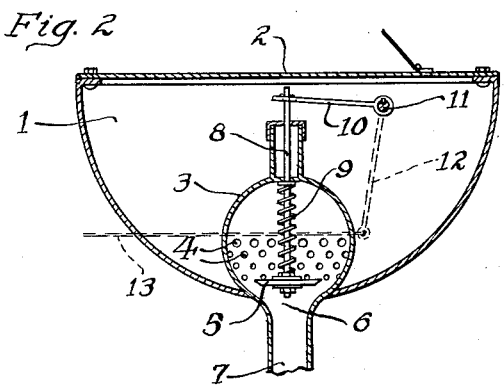
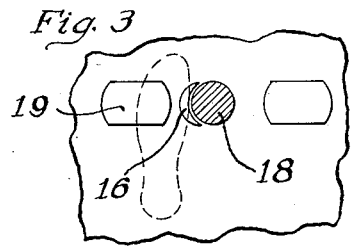
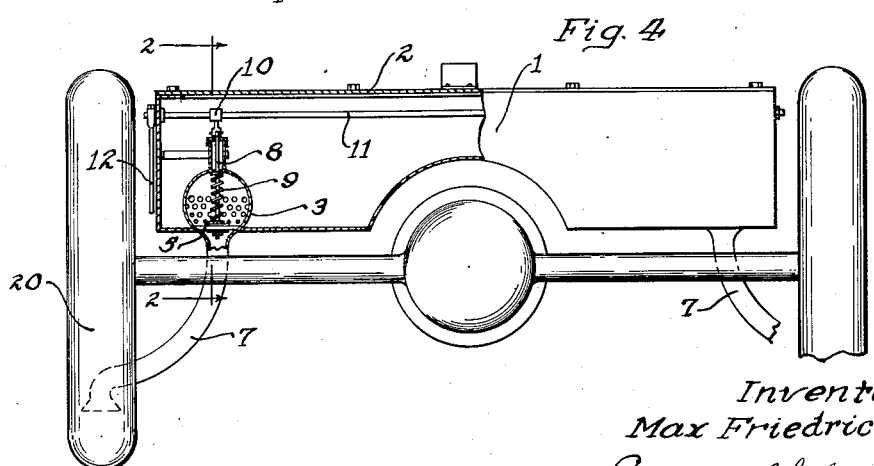
Inventor
Max Friedrich
By Arnold M Ehrlich
atty.

UNITED STATES PATENT OFFICE 2,003,631

SAND BRAKING DEVICE, PARTICULARLY ADAPTED FOR USE ON AUTOMOBILES

Max Friedrich, Chicago, Ill.

Application March 30, 1933, Serial No. 663,585

1 Claim. (Cl. 291—36)

My invention is a sand braking device, particularly adapted for use on automobiles, in which a sand spreading mechanism in the rear of vehicle, is actuated by a sand pedal and adapted to be operated in conjunction with the operation of the clutch pedal. The objects of my invention are: to provide a sand braking device wherein sand is spread in front of the rear wheels of the vehicle by a spout from the sand reservoir and a shut-off in the reservoir operated by a pedal adjacent to the clutch pedal.

This invention is advantageous over other devices in that; it is a simple mechanically operated device requiring little or no adjusting or repairing after installation and it is not directly connected to the clutch or brake, thereby eliminating the necessity of disconnecting, when the device is not in use.

An illustrative embodiment of this invention is shown in the accompanying drawing, wherein:

Fig. 1 is a side view of an automobile showing the device in position.

Fig. 2 is a vertical section of the sand reservoir and the shut-off in open position, on line 2—2, Fig. 3.

Fig. 3 is a plan view 3—3, Fig. 1 of the pedal arrangement.

Fig. 4 is a rear view, with a portion of the reservoir cut away, the sand trap in cross section and the shut-off in closed position.

In the form shown in the accompanying drawing, the sand braking device comprises a sand reservoir 1, extending over the rear axle of the vehicle and having a removable cover 2. At each end of the reservoir 1, is a spherical sand trap 3, the lower half of which is perforated with small holes 4, to permit the sand to seep inside the trap 3. The shut-off or stopper 5, preferably made of thick rubber, is seated in the opening 6 of the spout 7, and suitably fastened to one end of rod 8. The stopper 5 is actuated downward into opening 6, by a strong spring 9. The upper end of rod 8 is linked to lever arm 10 in such a manner as to be lifted upward, as the lever arm 10, is keyed to shaft 11, which is revolved by the actuating lever arm 12 outside the sand reservoir 1. This arm 12 is connected by a flexible wire or cable 13, extended over guides or pulleys 14, to the lower end 15, of the pedal 16. On the pedal 16 is an enclosed spring 17 suitably fastened on the steering shaft.

When the driver of the vehicle wishes to stop on slippery pavement, he simply moves his left foot into contact with the sand pedal 16. The pedal 16 may be depressed independent of the clutch pedal, but is adapted to be operated in conjunction therewith. By pressing the sand pedal 16 down, the wire or cable 13, is drawn forward, actuating the lever arm 12, thereby revolving the shaft 11, and the lever arm 10. The lever arm 10 raises the rod 8, against the action of the spring 9, allowing the sand to pour into the opening 6 of the spout 7, and out the other end of the spout, spreading the sand on the pavement directly in the path of the rear wheels 20, thereby presenting a rough surface to the tires as the brakes are applied, and preventing the slipping of the tires and the subsequent skidding of the machine.

Upon release of sand pedal 16, the spring 17 forces the pedal 16 back to normal position and also gives slack to the cable 13. The slack in the cable 13 permits the spring 9 to force the stopper 5 into the seat of the opening 6 of the spout 7, thereby shutting off the stream of sand through the spout. Drawing down the stopper 5 naturally brings the lever arm 10 down, revolving the shaft 11 and the lever arm 12, back to their normal position, making the cable 13 taut and the entire mechanism in readiness for the next application of the sand pedal 16.

Although but one specific embodiment of this invention has been herein shown and described, it will be understood that numerous details of the construction shown may be altered or omitted, without departing from the spirit of this invention.

What I claim is:

A sanding device including a supply reservoir; a bulbular sand trap within said reservoir, an outlet spout connected with said trap, a downwardly closing spring controlled valve arranged within said trap for normally closing said outlet; said trap having only its lower half formed with perforations to limit the amount of sand entering the outlet spout, but at the same time, permitting enough sand to enter the trap to assist in closing the valve and foot operated mechanism connected with said valve for opening said valve at predetermined intervals.

MAX FRIEDRICH.